Nov. 24, 1942. L. J. OLIVIER 2,302,883
METHOD OF STRINGING AND SAGGING WIRES AND APPARATUS FOR USE THEREIN
Filed March 5, 1942   2 Sheets-Sheet 1
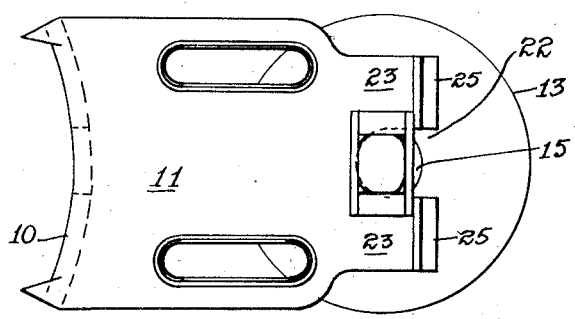
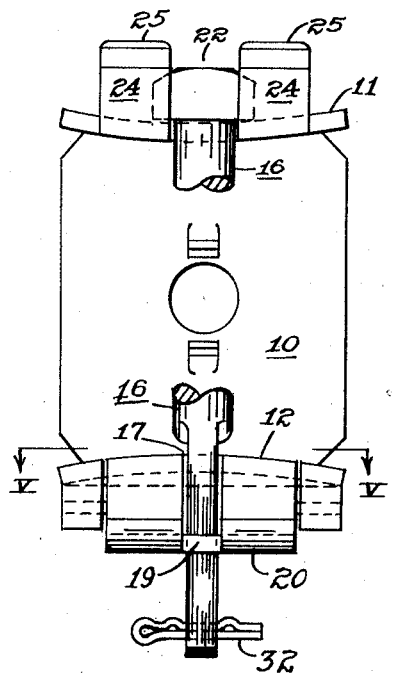
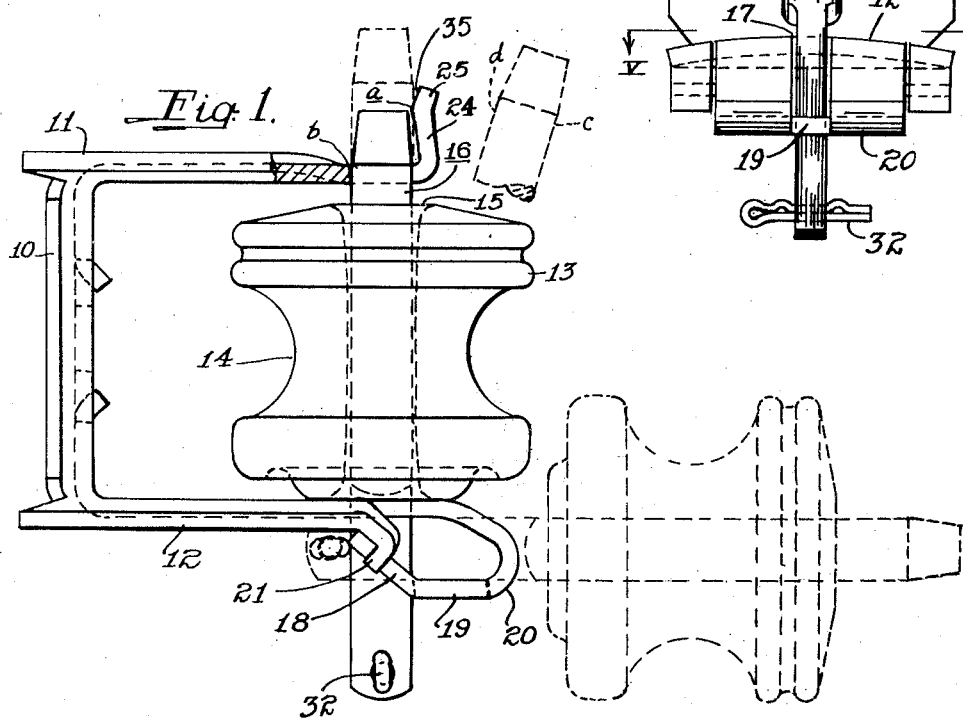
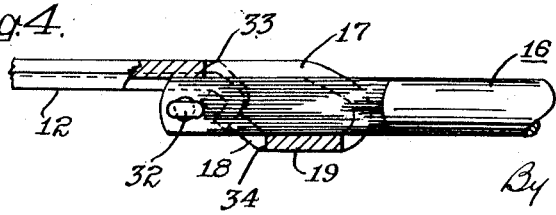
INVENTOR
Leon J. Olivier
By Green & McCallister
His Attorneys

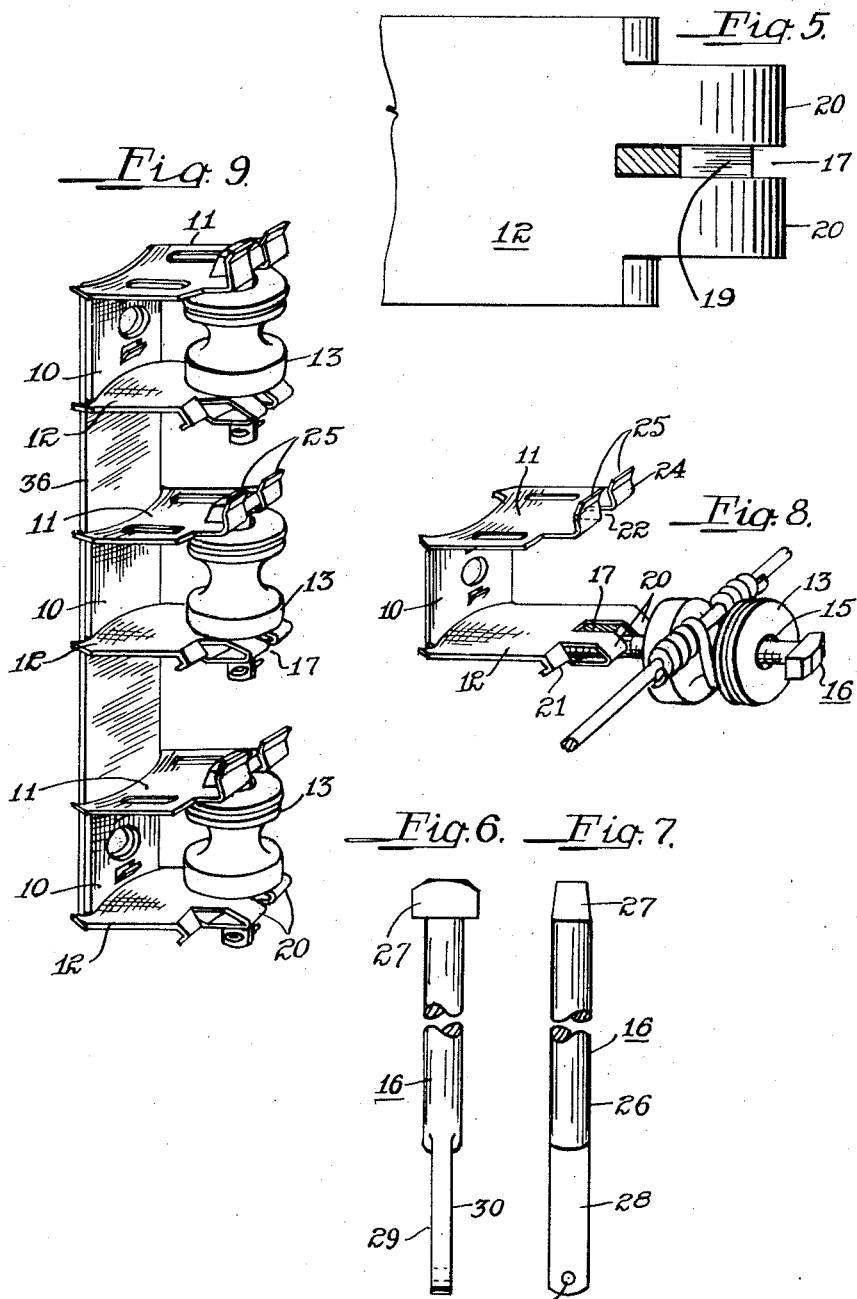

Patented Nov. 24, 1942

2,302,883

UNITED STATES PATENT OFFICE 2,302,883

METHOD OF STRINGING AND SAGGING WIRES AND APPARATUS FOR USE THEREIN

Leon J. Olivier, New Orleans, La.

Application March 5, 1942, Serial No. 433,424

13 Claims. (Cl. 174—161)

My invention relates to wire stringing, sagging and supporting apparatus and more particularly to apparatus for stringing, sagging and supporting the bare or insulated wires of electric power distribution systems and/or the method of stringing, sagging and supporting wires.

Conventional apparatus now in use for supporting the wires of power distribution systems holds the insulators in upright or vertical position between vertically spaced support arms of such apparatus.

Conventionally, wires are separately strung from pole to pole by means of hand lines which are attached to each wire, and in carrying out this procedure, each hand line and the bare or insulated wire to which it is attached is threaded through one of the openings in the apparatus, which opening is bounded by a pair of vertically spaced support arms, one of the insulators and the base member of the apparatus which carries said arms. Each wire, as it is being pulled from pole to pole through these openings, rides on the rigid support arm forming the bottom of said opening, and it will be readily seen that the wire and/or insulation is liable to be injured as it is dragged over the upper surface of such arm. Aside from this, much time is required to thread the hand lines and wires through these openings.

After a wire has been pulled into position, it must be uniformly sagged between poles, and, since each wire rests on a number of these conventionally rigid metal support arms, it is subjected to considerable friction, which makes it difficult to obtain uniform sagging throughout the length of the wire.

An object of this invention is to produce an improved apparatus for stringing, sagging and supporting bare or insulated wires such as used in electric power distribution systems.

Another object is to produce wire supporting apparatus which eliminates the procedure of stringing hand lines and wires through any openings.

A further object is to produce wire supporting apparatus by the use of which injury to the bare or insulated wire during tensioning or sagging of the wire is greatly reduced.

A further object is to produce wire supporting apparatus by means of which uniform sagging of the wires between poles can be readily obtained without injury to the wire and/or insulation.

A further object is to produce improved apparatus for supporting a number of insulated wires of a distribution system and by the use of which such wires may be pulled into place by a single hand line, swung as a unit to the men on the poles and by them placed on the proper insulators without the necessity of any threading of hand lines or wires through any openings in the support apparatus.

A still further object of this invention is to provide a new and improved procedure or method of stringing, sagging and supporting wires such as used in electric power distribution systems.

These and other objects which will be apparent to those skilled in this particular art, I attain by means of the device described in the specification and illustrated in the drawings accompanying and forming part of this application.

In the drawings:

Figure 1 is a side elevational view of wire supporting apparatus embodying this invention and for use with a single insulator. This view, by full lines, shows the insulator and its mounting bolt or spindle in normal vertical position and by dotted lines, shows the insulator bolt or spindle swung to a preliminary or wire receiving position.

Figure 2 is a top plan view of the apparatus of Figure 1;

Figure 3 is a front elevational view of the apparatus of Figures 1 and 2 with the insulator omitted and with an intermediate portion of the insulator bolt or spindle broken away;

Figure 4 is a fragmentary detail view, partially in section and partially in elevation, illustrating the pivotal connection between the lower support arm and the insulator bolt or spindle and the means for limiting the downward swinging movement of the insulator and its bolt or spindle;

Figure 5 is a section taken on line V—V of Figure 3, looking in the direction of the arrows;

Figures 6 and 7 are front and side elevational views respectively of the insulator bolt or spindle;

Figure 8 is a perspective view of the wire supporting apparatus of this invention, with the insulator and its bolt or spindle swung to preliminary or wire receiving position; the position shown by dotted lines in Figure 1; and with a transmission wire tied in place to the insulator; and Figure 9 is a perspective view of a multi-insulator supporting apparatus embodying this invention.

In the device of Figures 1–8 inclusive, the support apparatus is formed as a bracket and comprises a base 10 and outwardly extending upper and lower supports or arms which are respectively numbered 11 and 12. A spool-like insulator 13 having a circumferentially extending wire groove 14 and a through hole 15 is loosely mounted on a bolt or spindle 16 which, when the insulator is in normal vertical position, is engaged by said supports or arms 11 and 12.

Support or arm 12, upon which the insulator rests when in normal or vertical position, is provided with a slot 17 and a bifurcated end; one of the furcate parts 18 being shown by full lines in Figure 1 and by dotted lines in Figure 4. A solid portion 19 lies between slot 17 and said bifurcated end. Part of the slotted portion of support or arm 12, said solid portion 19 and the bifurcated end are bent downwardly and back upon the major portion of the support or arm to form a rounded end 20 for the arm. The furcate parts 18 straddle the bolt or spindle 16 and are held against outward movement away from the bolt by members 21 which are cut from the arm proper and are bent downwardly to embrace the bifurcated end.

The upper support or arm 11 has its outer end provided with a slot 22 and its end portions 23 on opposite sides of said slot have portions 24 thereof bent upwardly and slightly backward with their extreme ends 25 bent forwardly to provide prongs for latching the bolt 16 in vertical position; the forward bending of the extreme ends 25 provides surfaces 35 which serve as cam surfaces by which the prongs are sprung as the bolt head is forced down into bolt latching position.

The distance from point $a$, which is the lowermost point of each cam surface 35, to a line projected vertically upward from point $b$, which point is the inner edge of slot 22 in upper support or arm 11, is less than the distance between edges $c$ and $d$ of the bolt head, and because of this, it is necessary to force the bolt head downwardly past point $a$ of the prongs and into bolt latching position. This downward movement springs prongs 24 outwardly.

Bolt or spindle 16 is provided with a cylindrical portion 26 which is surrounded by the insulator, a head 27 which extends laterally beyond said cylindrical portion, a lower portion 28 which has parallel sides 29 and 30, and a hole 31 adjacent its lower end for receiving retaining means 32, here shown as a double hump cotter pin.

The lower portion 28 of bolt or spindle 16 passes through slot 17 in lower arm 12, and between the inner end 33 of said slot, and the inner end 34 of solid portion 19; thus forming the pivotal connection between the bolt or spindle and lower support or arm 12.

Bolt or spindle 16 is prevented from turning when in vertical position by reason of its head and parallel sides 29 and 30 of its lower portion 28; the distance between parallel sides 29 and 30 being but slightly less than the width of slot 17. Furcate parts 18 which lie astraddle flattened portion 28 of the bolt or spindle, when the same is swung down to preliminary or horizontal position, prevent the bolt or spindle from turning.

Figure 9 of the drawings illustrates a multiple insulator support embodying this invention. This comprises a base 36 to which three single support structures such as disclosed in Figures 1 to 8 are secured. Base 36 may be of any desired form or construction and the single insulator support structures are arranged in spaced relation and in vertical alignment and may be secured to the base in any desired manner. When in normal position, the bolts or spindles and the insulators are in vertical or upright position, as shown by full lines in Fig. 1.

Each of the bolts or spindles may be unlatched by upward pressure exerted on its lower end. When unlatched, each bolt or spindle may be swung downwardly to preliminary position where the insulator carried thereby rides the bolt forming an ideal roller element on which the bare or insulated wire may be readily placed without being threaded, and pulled to position without injury to the wire and/or insulation.

The ground man pulls the wire by means of a hand line attached thereto and when he reaches a position past each pole, he swings the bare or insulated wire up to the man on the pole who merely lays it within the wire groove of the insulator; having first swung the spindle and insulator to horizontal position after unlatching the spindle.

If there are two or more wires, these can be pulled into position past the pole by one hand line and then swung up, as a unit, to the man on the pole. The man on the pole after unlatching and swinging the spindles and insulator to horizontal position, lays each wire on the proper insulator.

It will be readily seen that after the wires have been strung throughout their entire length, they can be sagged to uniform tension between poles, without any difficulty and without any injury to the wire and/or insulation, since friction and resistance at the points of support are practically entirely eliminated. Under such condition, they have a tendency to automatically adjust themselves to a uniform tension, since they are allowed to assume, in each span, the correct sag corresponding with the desired tension.

After the wires are placed in position and tensioned or sagged, a lineman mounts each pole in turn and ties the wires to the insulators while the insulators are still in a preliminary or horizontal position.

After the wires are tied in place on the insulators, each insulator and its bolt or spindle is swung upwardly to vertical position and the bolt or spindle is latched to its upper support arm 12 by merely forcing it down past its latching prongs or until its head rests on upper arm 11. The prongs form effective means for positively locking the bolts or spindles in upright or vertical position.

Having thus described my invention, what I claim as new and desire to secure by Letters Patent is:

1. Wire supporting apparatus comprising a support, a spindle having pivotal connection with said support, an insulator rotatably carried by said spindle, means on said support for supporting said spindle in horizontal position in which the insulator can serve as a roller support for the wire, and means carried by said support for positively locking said spindle at an angle to its horizontal position.

2. Wire supporting apparatus comprising a support, a spindle having pivotal connection with said support, an insulator rotatably carried by siad spindle, means on said support for supporting said spindle in horizontal position in which said insulator can serve as a roller support for the wire, and means carried by said support for positively locking said spindle in vertical position.

3. Wire supporting apparatus comprising a support, a spindle having pivotal connection with said support, an insulator rotatably carried by said spindle, means on said support for supporting said spindle in a horizontal position where said insulator serves as a support roller, and means carried by said support for latching said spindle in position at an angle to its horizontal position.

4. Wire supporting apparatus, comprising a support, a spindle having sliding pivotal connection with said support, an insulator rotatably carried by said spindle, means on said support for supporting said spindle in a horizontal position in which said insulator is supported solely by said spindle and serves as a roller support for the wire, and means carried by said support for positively locking said spindle at an angle to its horizontal position.

5. Wire supporting apparatus comprising vertically spaced supports, a spindle having pivotal connection with the lower of such supports, an insulator rotatably carried by said spindle, means on the lower support for supporting said spindle in a substantially horizontal position where the insulator can serve as a support roller, and means carried by the upper of such supports for positively locking said spindle at an angle to its horizontal position.

6. Wire supporting apparatus comprising vertically spaced supports, a spindle having sliding pivotal connection with the lower of said supports, an insulator rotatably carried by said spindle and movable longitudinally thereof, means on said lower support for supporting said spindle in horizontal position where said insulator is supported solely by said spindle and can serve as a support roller, and means carried by the upper support for positively locking said spindle in vertical position in which the insulator is located between said supports.

7. Wire supporting apparatus comprising vertically spaced arms, a spindle having pivotal connection with the lower of said arms, an insulator rotatably carried by said spindle, means on said lower arm for supporting said spindle in substantially horizontal position where said insulator can serve as a support roller for the wire, and spring latching means on the upper arm for positively locking said spindle in vertical position in which the insulator is located between said arms.

8. Wire supporting apparatus comprising a series of pairs of spaced supports, a spindle having pivotal connection with the lower support of each such pair, an insulator carried by each such spindle, means on the lower support of each such pair for supporting such spindle in horizontal position so that the insulator carried thereby can serve as a support roller, and means carried by the upper support of each such pair for positively holding such spindle at an angle to its horizontal position with each insulator located between a pair of supports.

9. Wire supporting apparatus comprising a series of pairs of vertically spaced supports, a spindle having pivotal connection with the lower support of each such pair, an insulator rotatably carried by each such spindle, means on the lower support of each such pair for supporting such spindle in substantially horizontal position in which the insulator rides its spindle as a wire support roller element, and means carried by the upper support of each said pair for positively locking said spindle in vertical position.

10. A wire stringing procedure which comprises supporting a wire on a rotatable spool-like insulator while tensioning said wire and while said insulator is located in a substantially horizontal position, securing the wire to said insulator while so supported and then turning said insulator to and securing the same in a substantially vertical position.

11. A wire stringing procedure, which comprises supporting a wire on a series of horizontally spaced spool-like insulators mounted for rotation about horizontal axes, tensioning or sagging said wire while so supported, securing the wire to said insulators while the same are in horizontal position and then turning said insulators to and securing the same in upright position.

12. A wire stringing procedure which comprises supporting a wire on horizontally spaced rotatable spool-like insulators while sagging or tensioning the wire and while said insulators are substantially horizontally positioned, then securing said wire to each such insulator while so positioned and then turning said insulators to and locking the same in substantially vertical positions.

13. A wire supporting device comprising vertically spaced arms, an insulator support pin having pivotal connection with the lower of said arms and being normally latched to the upper of said arms, a spool type insulator loosely carried by said support pin and normally located between said arms, and stop means associated with the lower of said arms for limiting to horizontal position the downward swinging movement of said pin and the insulator carried thereby; the construction and arrangement being such that said pin when unlatched from the upper of said arms can be swung to and supported in horizontal position where the insulator can serve as a roller support for the wire.

LEON J. OLIVIER.